United States Patent [19]
Tachihara

[11] Patent Number: 4,735,493
[45] Date of Patent: Apr. 5, 1988

[54] WIPE-ANGLE ZOOM LENS SYSTEM
[75] Inventor: Satoru Tachihara, Tokyo, Japan
[73] Assignee: Asahi Kogaku Kogyo Kabushiki Kaisha, Tokyo, Japan
[21] Appl. No.: 822,161
[22] Filed: Jan. 24, 1986
[30] Foreign Application Priority Data Jan. 24, 1985 [JP] Japan .................................. 60-12052

[51] Int. Cl.$^4$ .......................... G02B 15/16; G02B 9/64
[52] U.S. Cl. ...................................................... 350/426
[58] Field of Search ......................................... 350/426
[56] References Cited

U.S. PATENT DOCUMENTS 4,465,343 8/1984 Horimoto ............................. 350/426

FOREIGN PATENT DOCUMENTS 0035323 3/1980 Japan ................................... 350/426

*Primary Examiner*—John K. Corbin
*Assistant Examiner*—Rebecca D. Gass
*Attorney, Agent, or Firm*—Sughrue, Mion, Zinn, Macpeak & Seas

[57] ABSTRACT

A wide-angle zoom lens system comprises, in order from the object side, a first lens group having a negative refractive power, a lens unit having a positive refractive power and a second lens group having a positive refractive power. The system performs zooming by displacing the two lens groups and one lens unit independently in the direction parallel to the optical axis while maintaining the position of the image surface constant. The system satisfies the following conditions:

$$D_{IW} > D_{IT}, \text{ and } D_{IIW} > D_{IIT}$$

where $D_I$ represents the aerial space between the first lens group and the lens unit, and $D_{II}$ designates the aerial space between the lens unit and the second lens group, with the subscripts W and T representing aerial spaces for the short and long focal length sides, respectively.

10 Claims, 14 Drawing Sheets

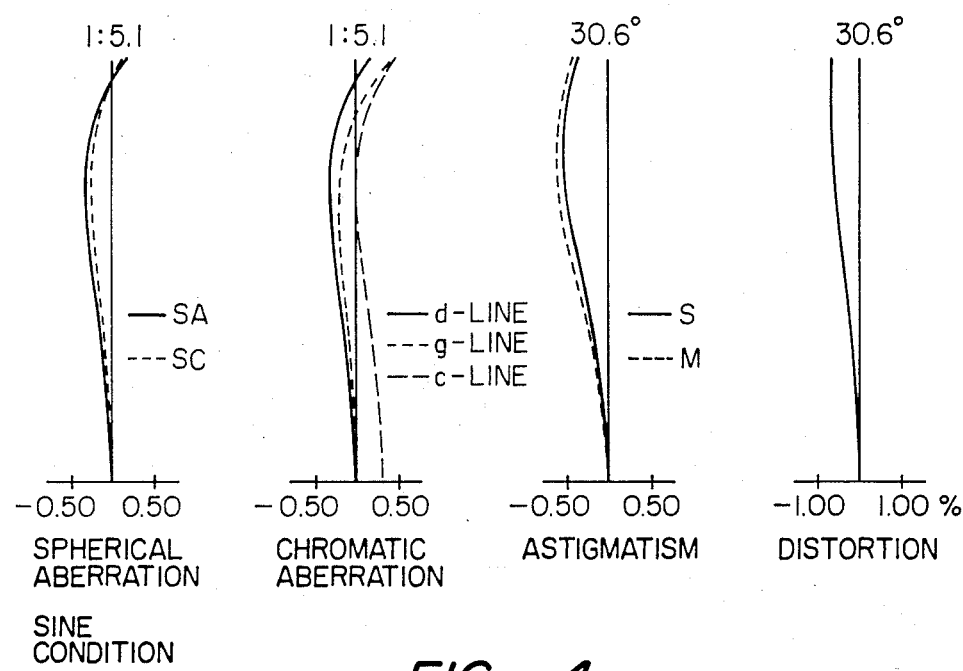
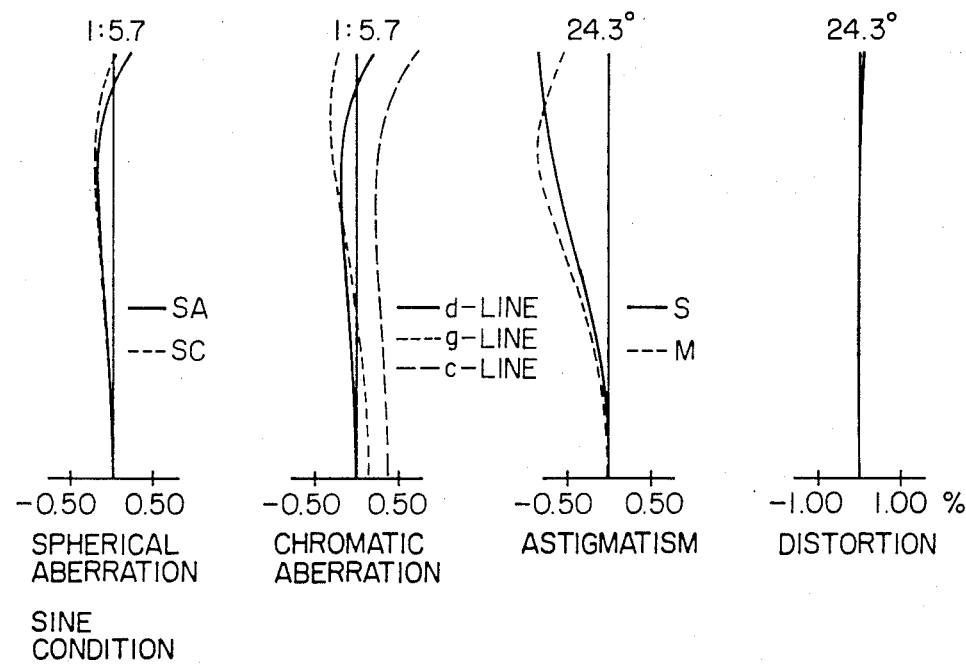

WIPE-ANGLE ZOOM LENS SYSTEM

BACKGROUND OF THE INVENTION AND PRIOR ART STATEMENT

The present invention relates to a zoom lens useful in photography. More particularly, the present invention relates to a wide-angle zoom lens for single lens reflex cameras that is capable of providing a view angle of about 80° at the wide-angle position while permitting a very effective compensation of aberrations, particularly distortion.

The performance of a zoom lens varies considerably during zooming and minimization of this variation has long been one of the major targets to be attained in system design. Most wide-angle zoom lenses employ the "two-lens-group" system and basically consist of a retrofocus type configuration. It is very difficult to perform effective compensation of barrel distortion at the wide-angle position of the retrofocus type lens system. This is particularly true with a wide-angle zoom lens of the type contemplated by the present invention which provides a viewing angle of about 80°, and it is generally understood that the manufacturer must bear with a certain amount of residual distortion in order to achieve a compromise between the need for system miniaturization and the minimization of the residual amounts of other aberrations.

The problems of the conventional zoom lens are hereunder described by reference to the two-lens-group type system. As is well known, zooming with the conventional two-lens-group type system from the short focal length to the long focal length is accomplished by varying, specifically stated, reducing, the distance between the front and rear groups. The diaphragm is customarily positioned either within or just in front of the rear group and is displaced simultaneously with the rear group.

The lenses responsible for compensation of barrel distortion that may develop in the system are a positive lens positioned closer to the object than the diaphragm and a negative lens positioned closer to the image than the diaphragm. Greater compensation effects are attained as the two lenses are positioned farther away from the diaphragm, namely as the primary beam of light intersects these lenses at positions farther away from the optical axis.

This fact should be taken into consideration in the following discussion of distortion that has occurred in the conventional two-lens-group type zoom lens at the short focal length side. Any barrel distortion that may develop at the short focal length side results from the fact that the front group has a negative refractive power and is distant from the rear group, i.e., far from the diaphragm. This suggests the possibility of reducing the distortion by decreasing the refractive power of the front group, but then, the size of the overall system is increased. Therefore, in order to compensate for barrel distortion without increasing the overall size of the system, it has been customary design practice to depend on a positive lens positioned within the front group and a negative lens positioned in the rear group closer to the image than the diaphragm.

In order to achieve satisfactory compensation of the distortion by this approach, only two methods are available; one method is to position the positive lens (in the front group) or the negative lens (in the rear group) farther away from the diaphragm, and the other method depends on increasing the refractive power of either one of the lenses. However, the first method is unable to satisfy the need for a compact system because not only the diameter of the front or rear lens but also the overall length of the system is increased. The second method is also undesirable since if the refractive power of the positive lens in the front group is increased, the refractive powers of negative lenses in the front group must also be increased in order to maintain the same negative refractive power of the front group. This however causes increased distortions of high orders, and as a result, the variation in the distortion with respect to a change in the angle of incident light is increased, particularly in the region of large incident angles, or residual coma aberration of high order occurs, making it difficult for the system to maintain the desired performance.

One may try to increase the refractive power of a negative lens positioned in the rear group closer to the image than the diaphragm, but this method has the same problems as described in the previous paragraph since the rear group as a whole has a positive refractive power.

It will be understood from the discussion above that so long as the conventional two-lens-group type zoom lens system is employed, one must bear with the existence of a certain amount of residual barrel distortion at the short focal length side to strike a balance with other aberrations and to realize a compact overall system.

Several attempts at effective compensation of the distortion have of course been reported. For example, Japanese Patent Publication No. 13003/1984 discloses a system that employs aspherical lens surfaces for the purpose of reducing the distortion to a little more than −3% with a viewing angle of 84°. However, this sytem has the general disadvantage of high manufacture cost resulting from the use of non-spherical lens surfaces.

Japanese Patent Publication No. 13850/1982 proposes a modified two-lens-group type zoom lens system wherein the rear group is divided into two subgroups, one being positive and the other negative. This system permits the three groups to be moved independently and thereby provides a greater degree of freedom in zooming operation. At the same time, this system depends on the negative lens subgroup for compensation of the distortion so that its amount and the variation during zooming can be minimized. However, this system permits a viewing angle of as small as 48° at the wide-angle position and is obviously unsuitable in designing a zoom lens system of the type contemplated by the present invention which is capable of providing a viewing angle of as wide as 80°.

OBJECTS AND SUMMARY OF THE INVENTION

The primary object, therefore, of the present invention is to provide an improved two-lens-group type zoom lens system that has a zoom ratio of approximately two and achieves a viewing angle of about 80° at the wide-angle position while eliminating the limits or problems associated with the conventional systems.

The wide-angle zoom lens system of the present invention enables a very effective compensation of distortion and other aberrations without introducing disadvantages such as increases in the overall system size and manufacturing cost.

According to the present invention, the wide-angle zoom lens system comprises, in order from the object side, a first lens group having a negative refractive power, a lens unit having a positive refractive power and a second lens group having a positive refractive power. The system performs zooming by displacing the two lens groups and one lens unit independently in the direction parallel to the optical axis while maintaining the position of the image surface constant. The system satisfies the following conditions:

$$D_{IW} > D_{IT}, \text{ and } D_{IIW} > D_{IIT}$$

where $D_I$ represents the aerial space between the first lens group and the lens unit, and $D_{II}$ designates the aerial space between the lens unit and the second lens group, with the subscripts W and T representing aerial spaces for the short and long focal length sides, respectively.

BRIEF DESCRIPTION OF THE DRAWINGS

FIG. 3 plots aberration curves for the system of Example 1 at its intermediate focal length;

FIG. 4 plots aberration curves for the system of Example 1 at its maximum focal length;

DETAILED DESCRIPTION OF THE PREFERRED EMBODIMENTS

Figure 1:
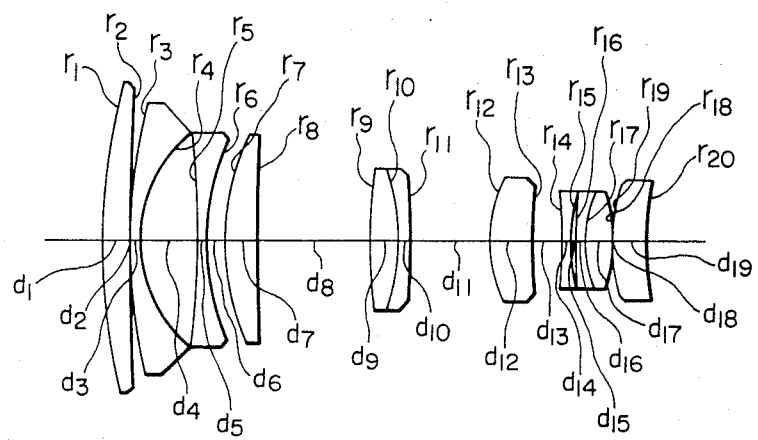
FIG. 1 is a sectional view of the zoom lens system of Example 1.
Figure 2:
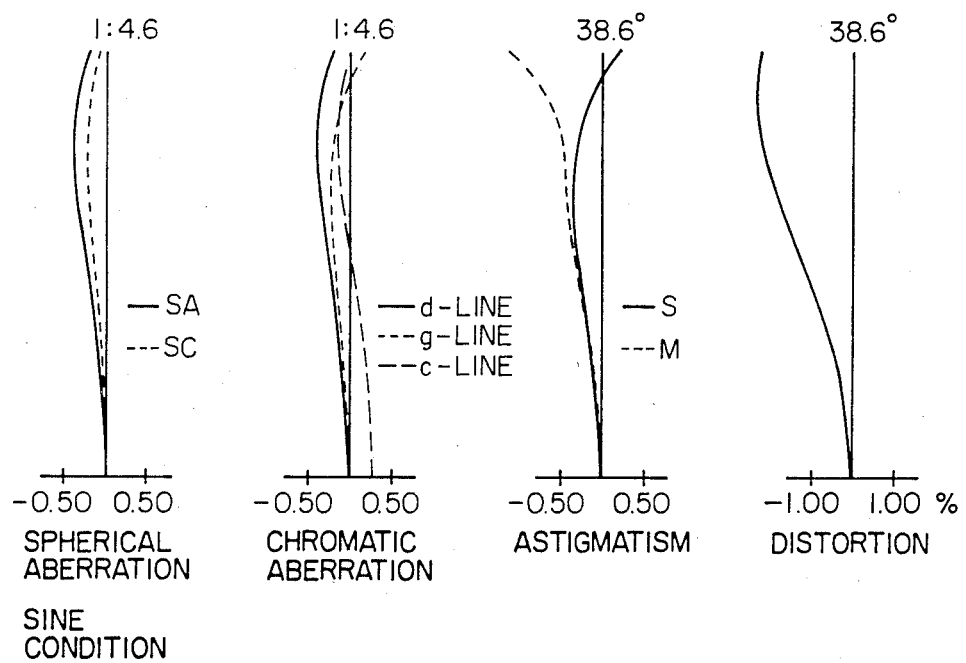
FIG. 2 plots aberration curves for the system of Example 1 at its minimal focal length.
Figure 5:
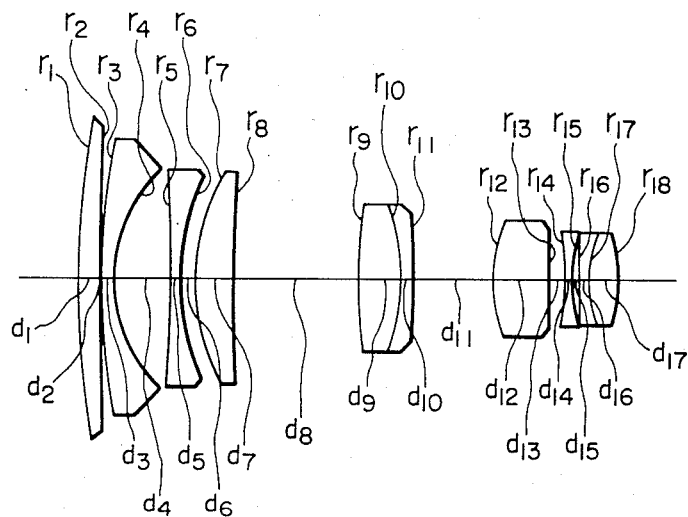
FIG. 5 is a sectional view of the zoom lens system of Example 2.
Figure 6:
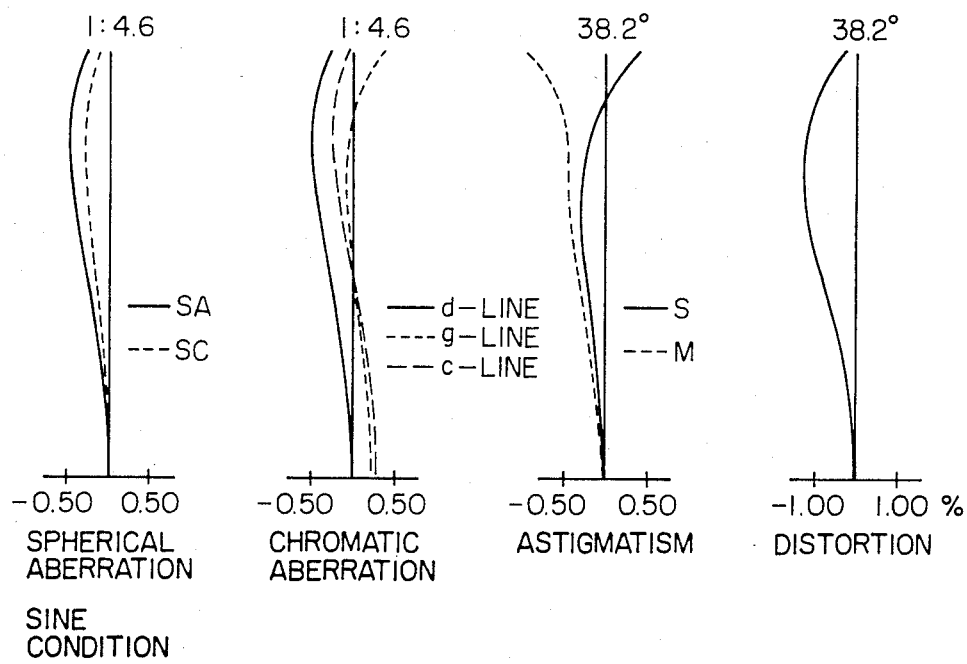
FIG. 6 plots aberration curves for the system of Example 2 at its minimal focal length.
Figure 7:
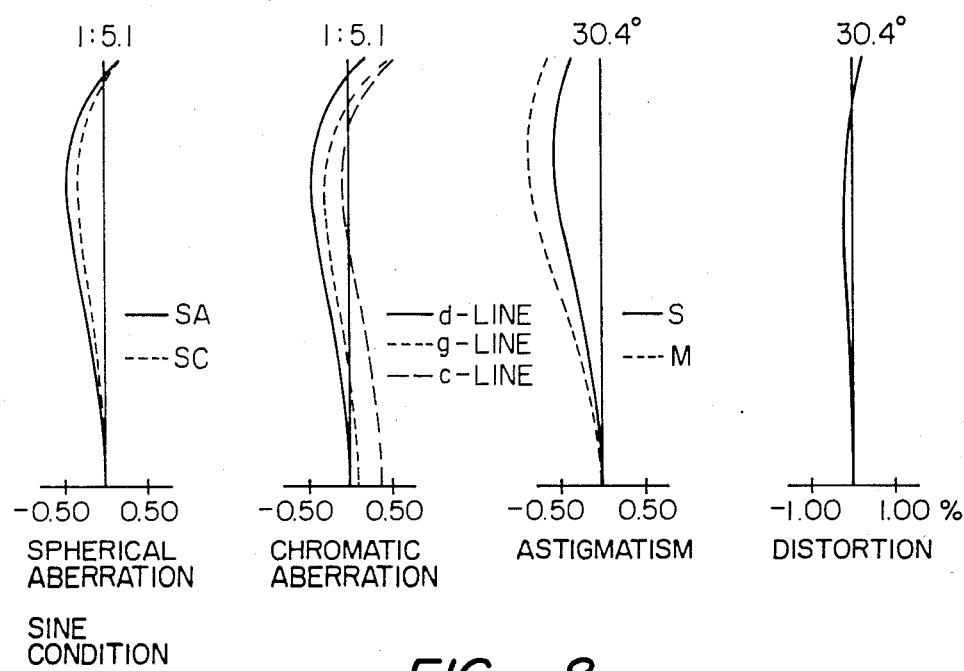
FIG. 7 plots aberration curves for the system of Example 2 at its intermediate focal length.
Figure 8:
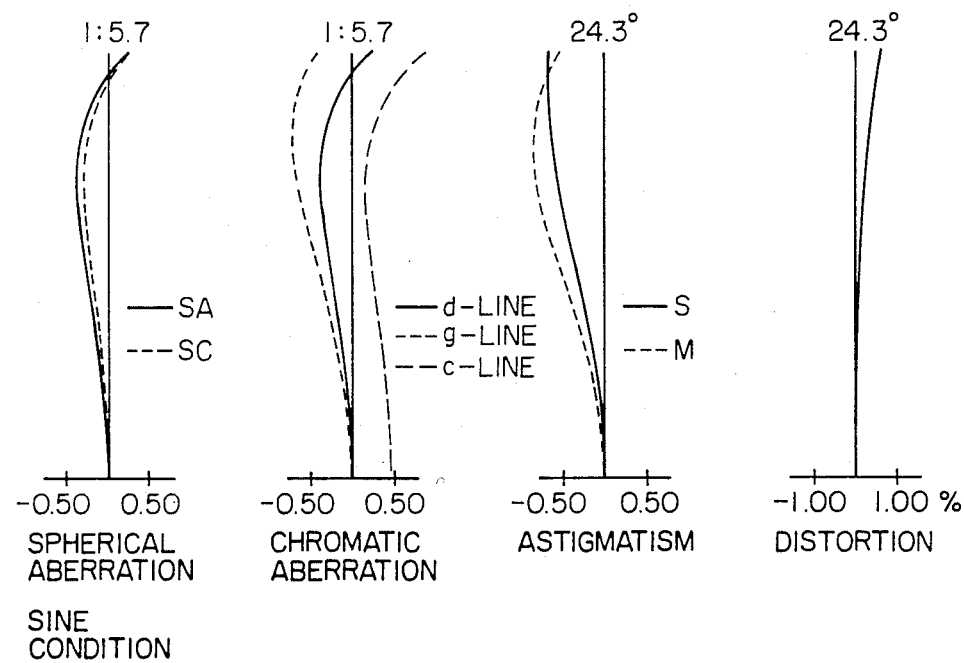
FIG. 8 plots aberration curves for the system of Example 2 at its maximum focal length.
Figure 9:
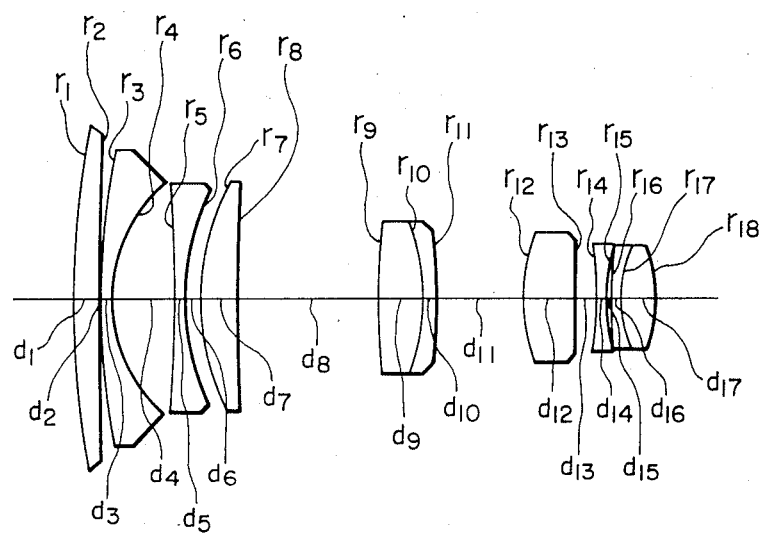
FIG. 9 is a sectional view of the zoom lens system of Example 3.
Figure 10:
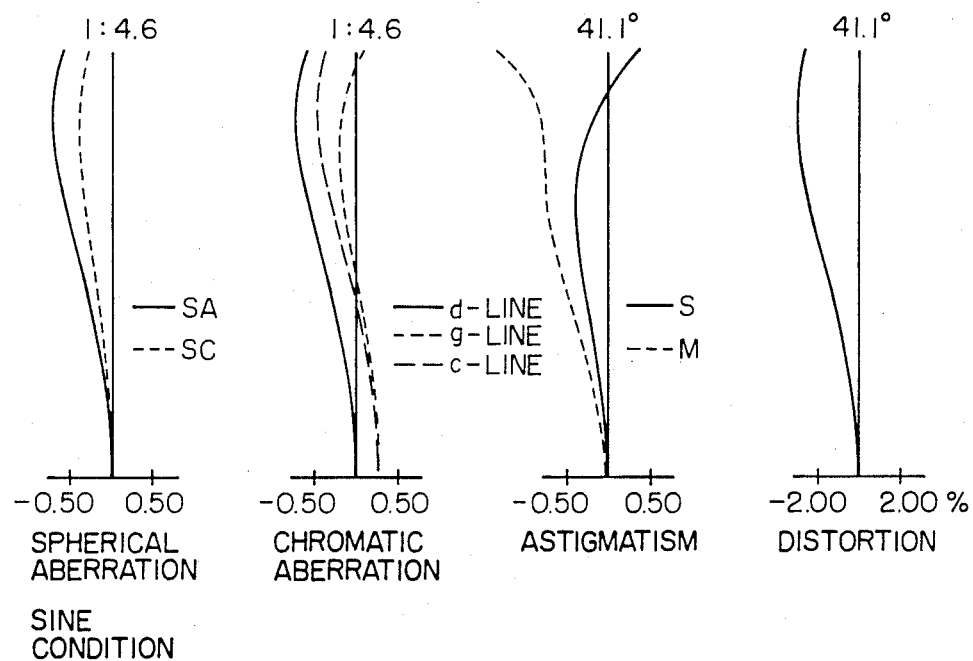
FIG. 10 plots aberration curves for the system of Example 3 at its minimal focal length.
Figure 11:
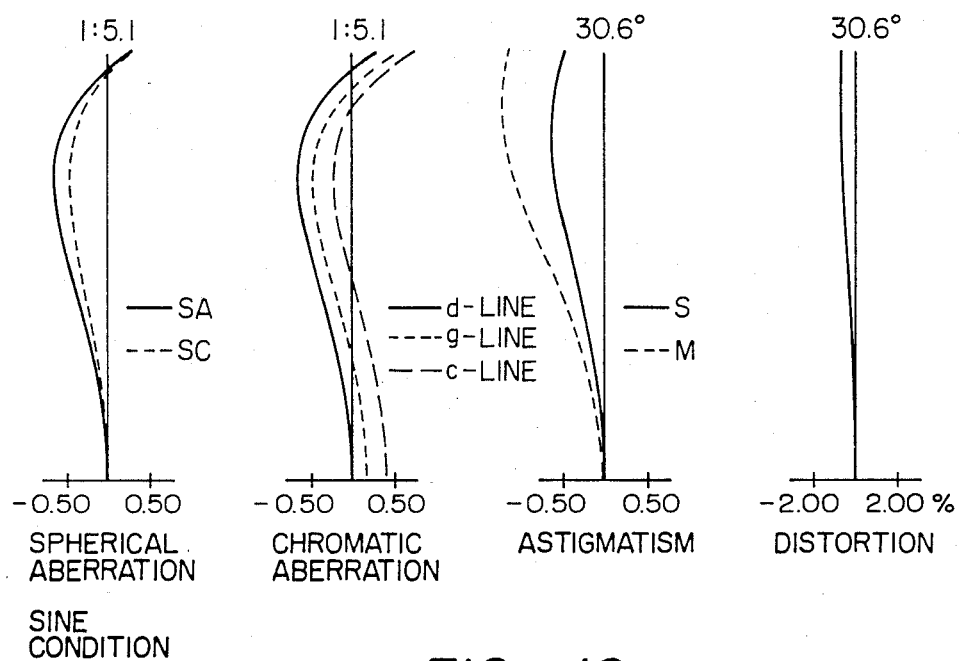
FIG. 11 plots aberration curves for the system of Example 3 at its intermediate focal length.
Figure 12:
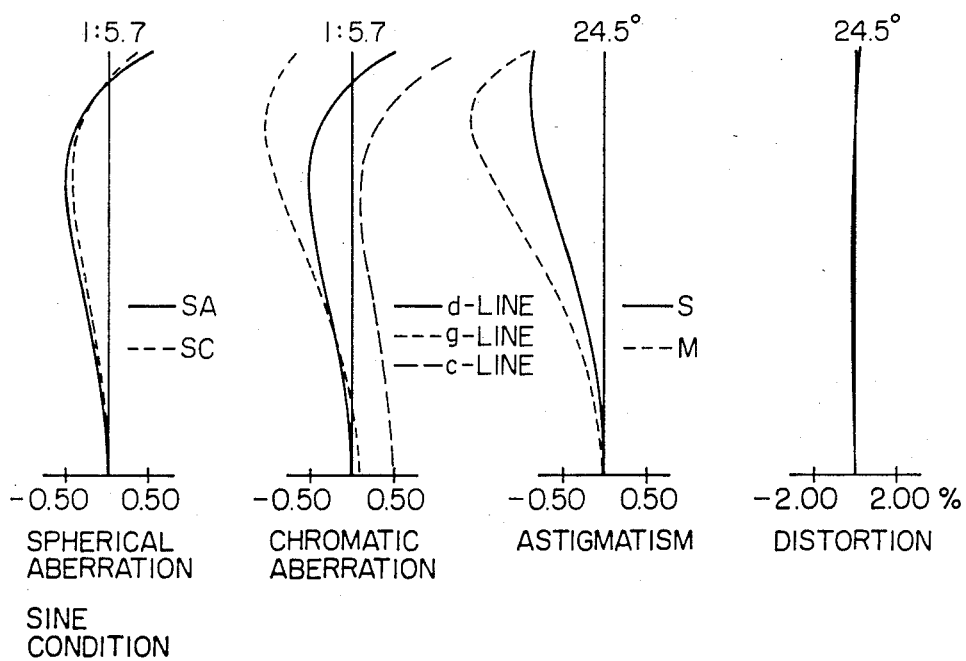
FIG. 12 plots aberration curves for the system of Example 3 at its maximum focal length.
Figure 13:
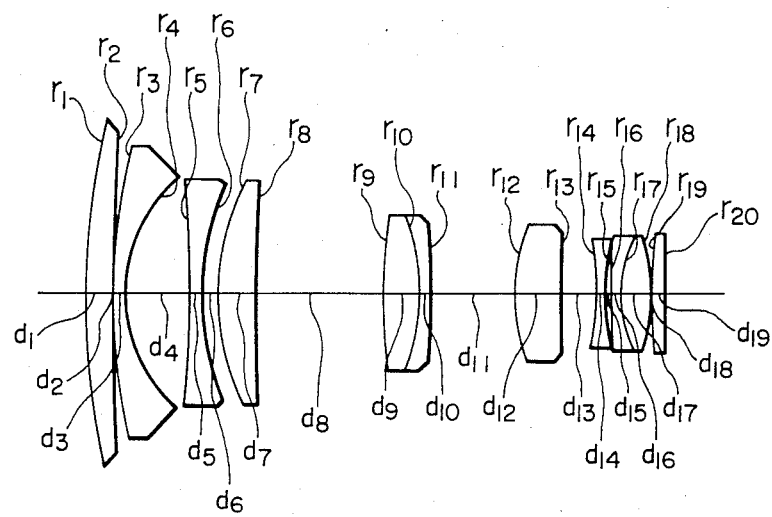
FIG. 13 is a sectional view of the zoom lens system of Example 4.
Figure 14:
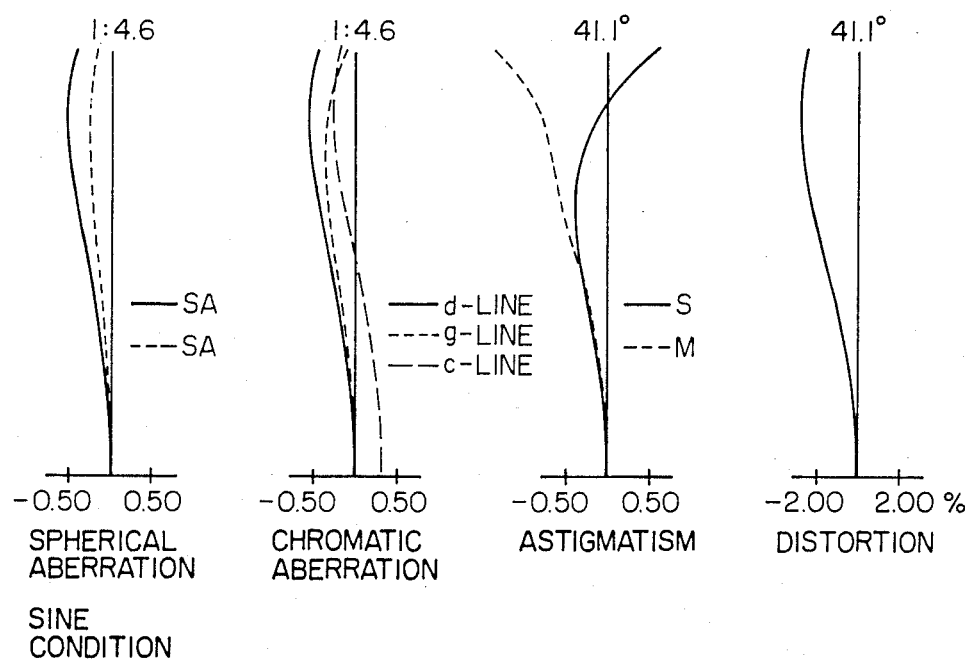
FIG. 14 plots aberration curves for the system of Example 4 at its minimum focal length.
Figure 15:
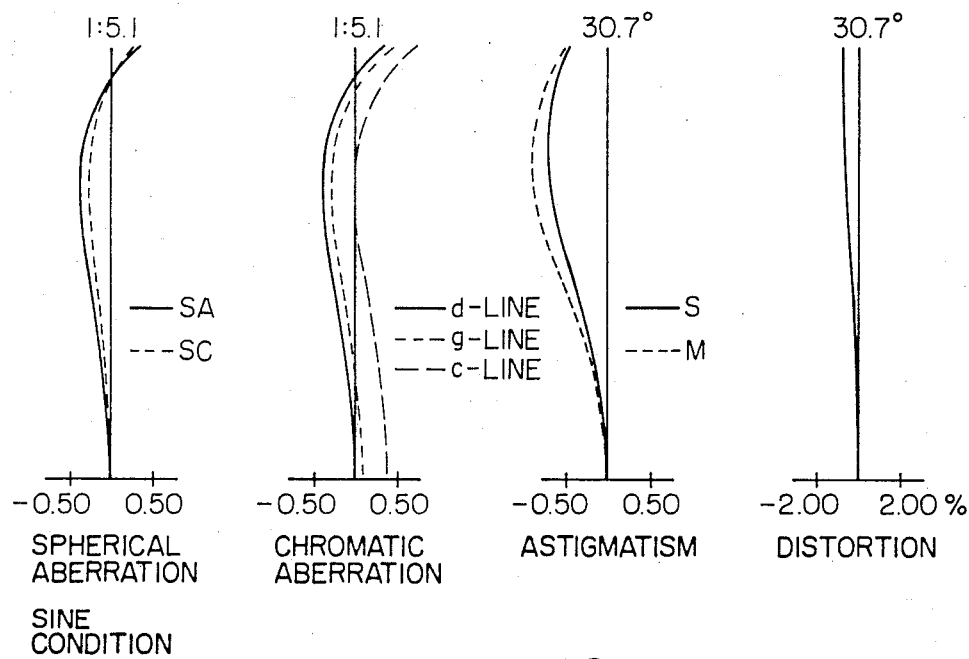
FIG. 15 plots aberration curves for the system of Example 4 at its intermediate focal length.
Figure 16:
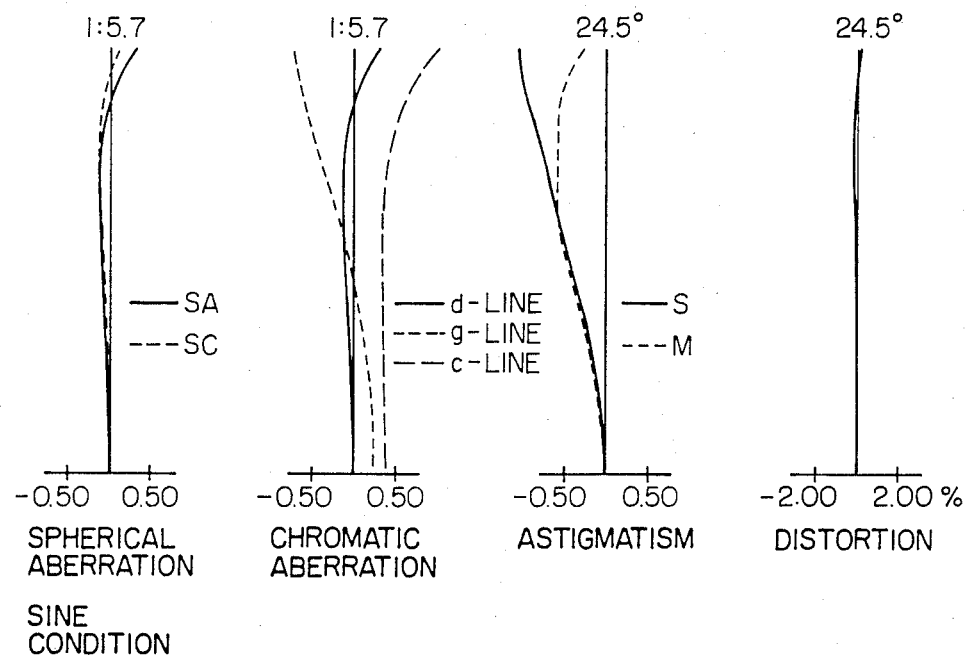
FIG. 16 plots aberration curves for the system of Example 4 at its maximum focal length.
Figure 17:
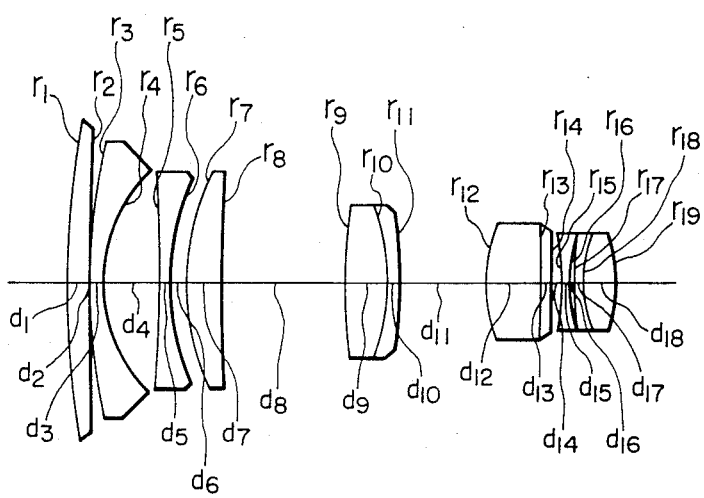
FIG. 17 is a sectional view of the zoom lens system of Example 5.
Figure 18:
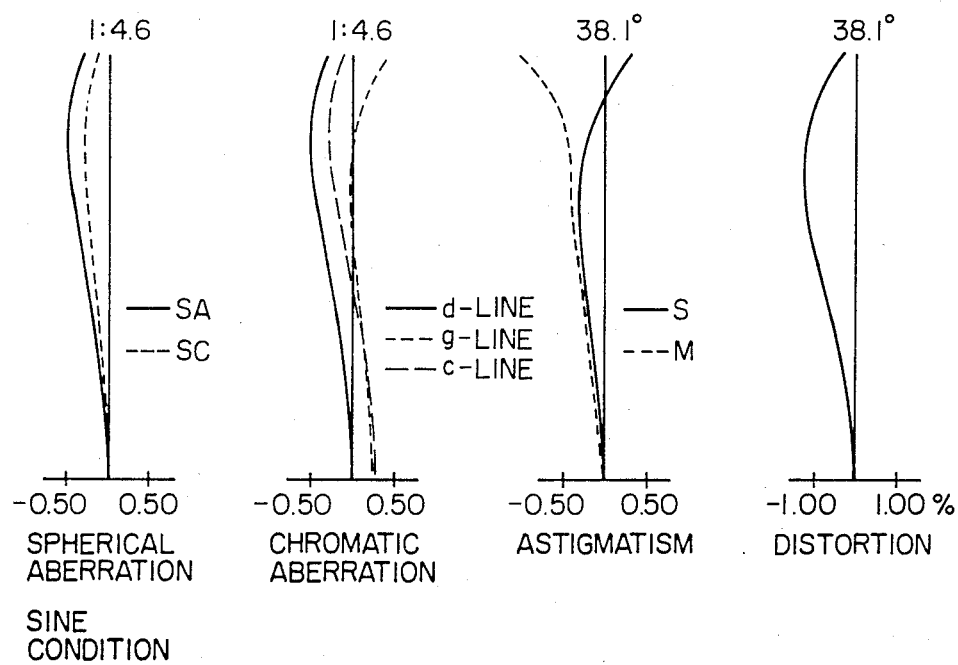
FIG. 18 plots aberration curves for the system of Example 5 at its minimum focal length.
Figure 19:
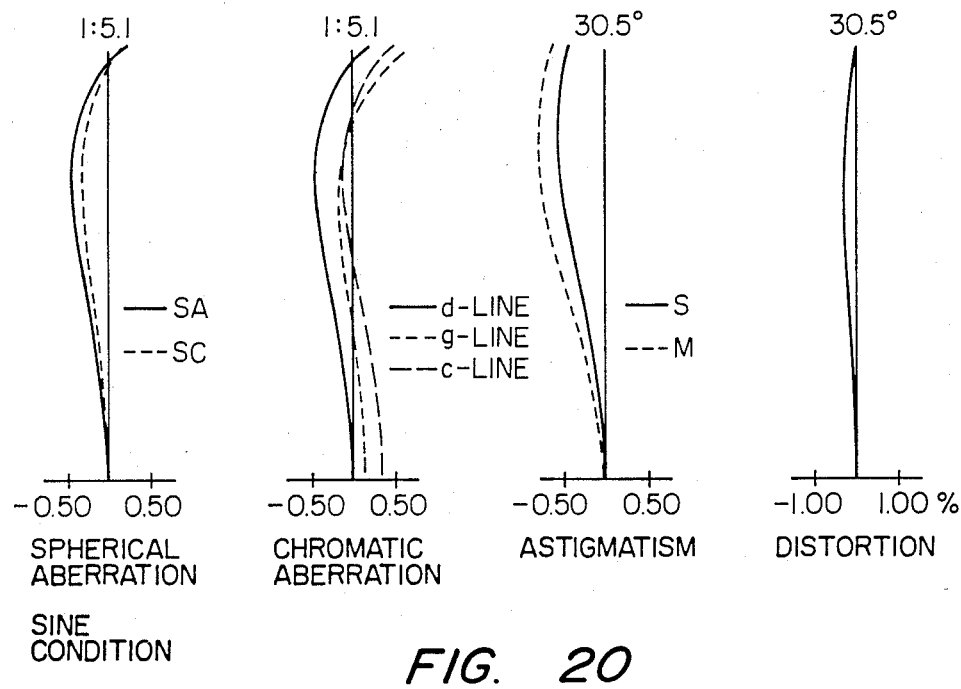
FIG. 19 plots aberration curves for the system of Example 5 at its intermediate focal length.
Figure 20:
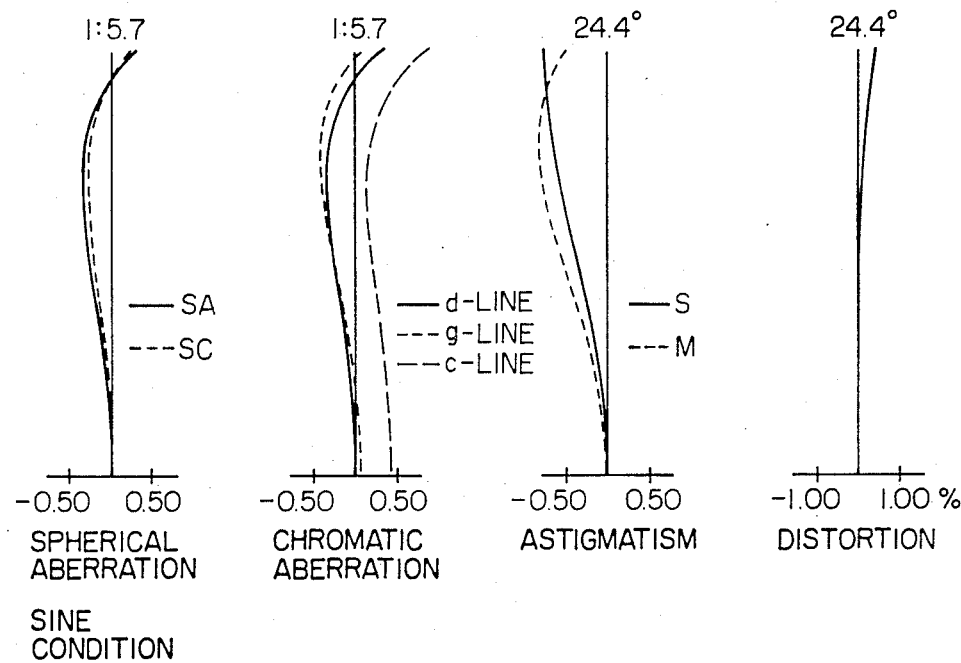
FIG. 20 plots aberration curves for the system of Example 5 at its maximum focal length.
Figure 21:
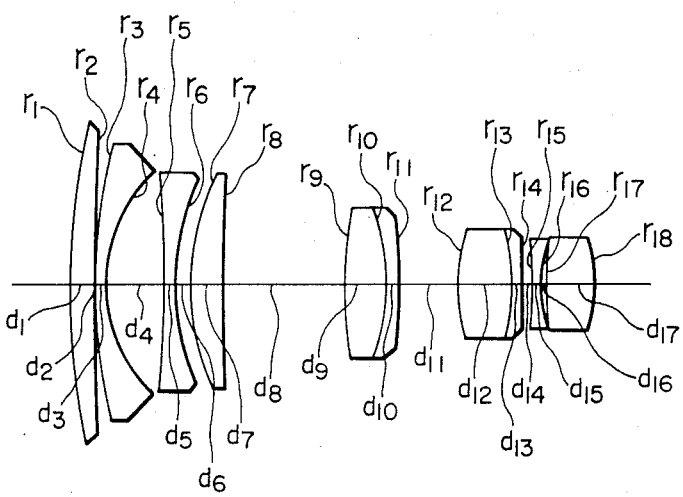
FIG. 21 is a sectional view of the zoom lens system of Example 6.
Figure 22:
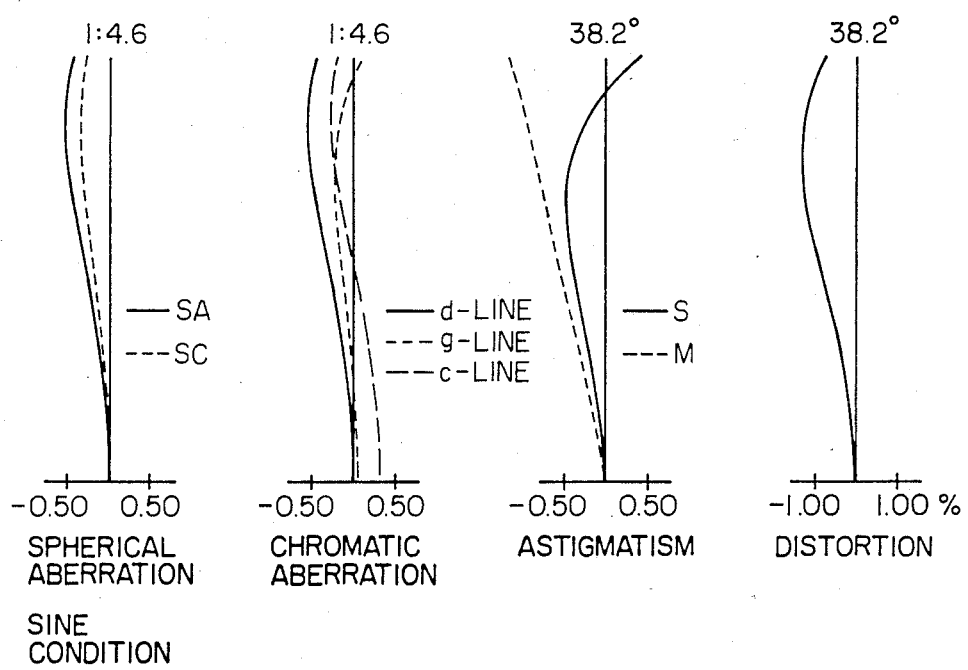
FIG. 22 plots aberration curves for the system of Example 6 at its minimum focal length.
Figure 23:
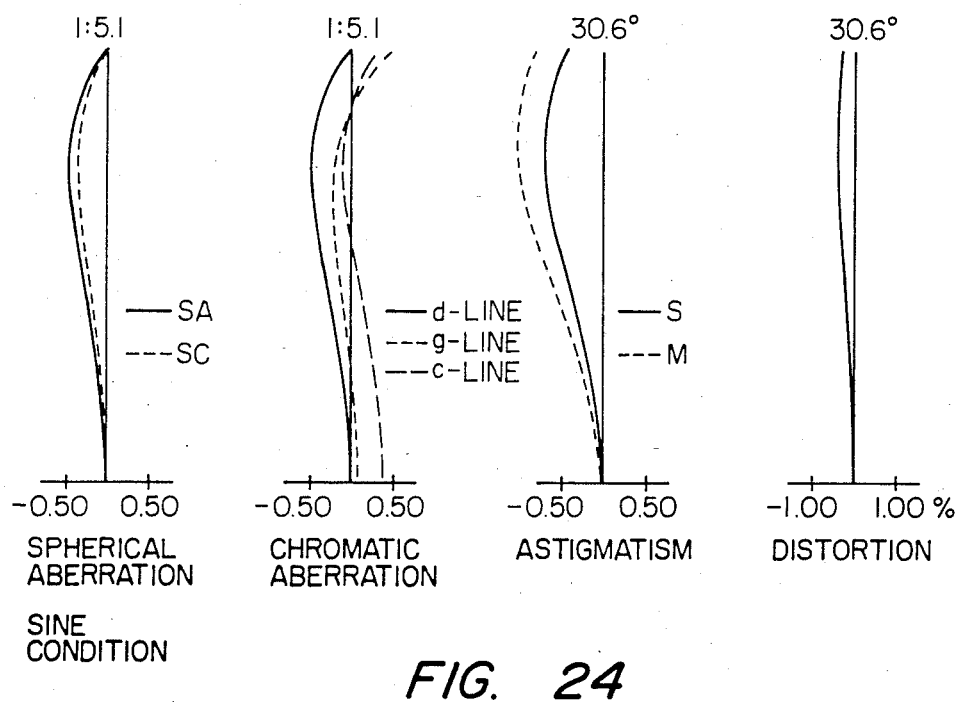
FIG. 23 plots aberration curves for the system of Example 6 at its intermediate focal length.
Figure 24:
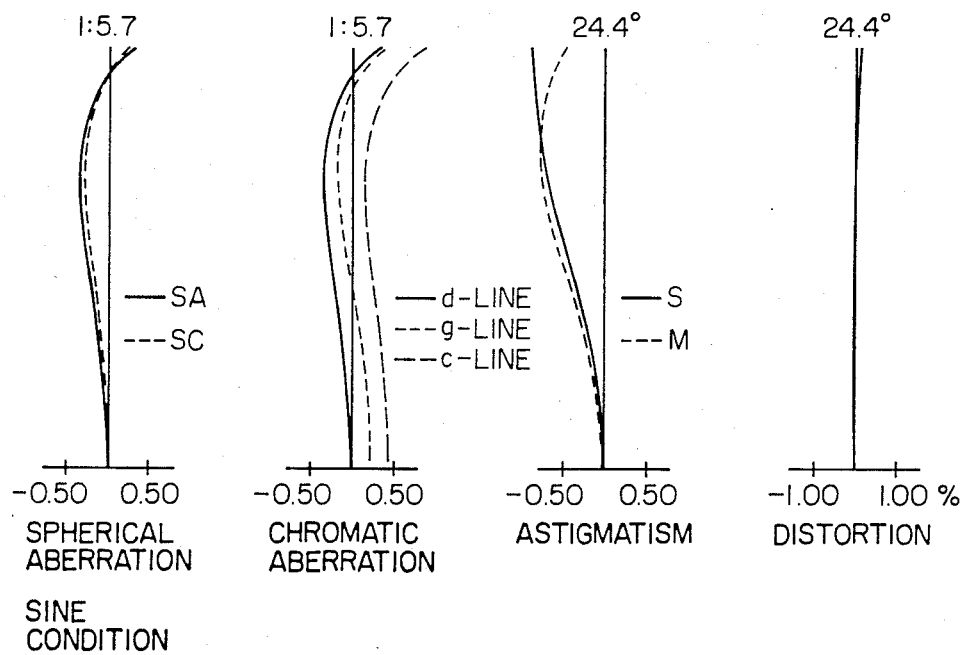
FIG. 24 plots aberration curves for the system of Example 6 at its maximum focal length.
Figure 25:
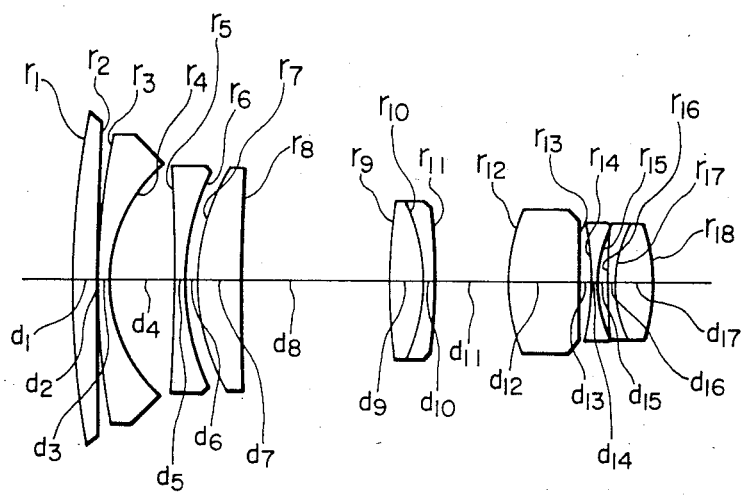
FIG. 25 is a sectional view of the zoom lens system of Example 7.
Figure 26:
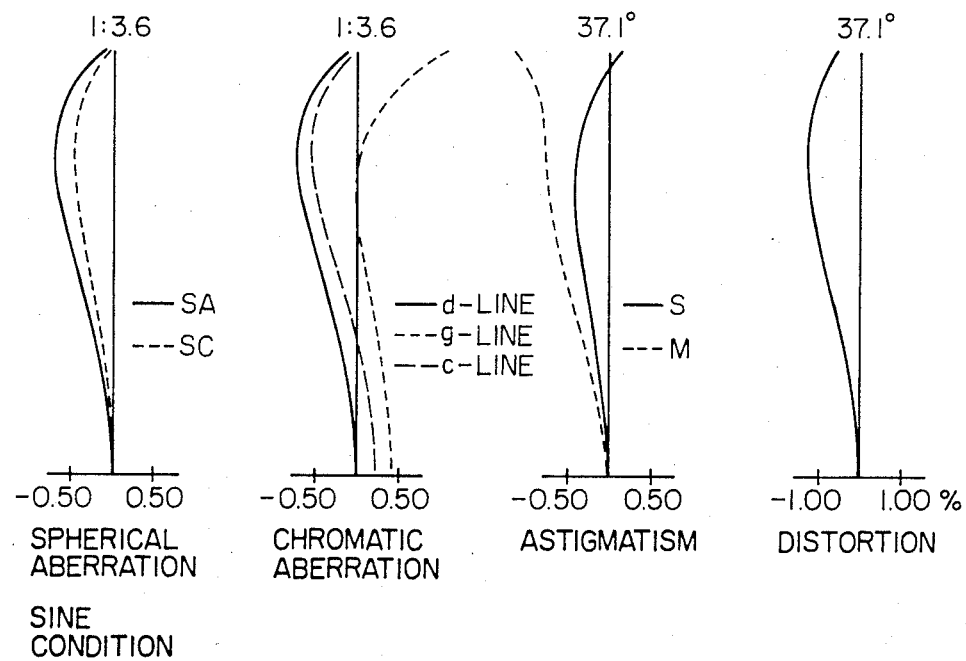
FIG. 26 plots aberration curves for the system of Example 7 at its minimum focal length.
Figure 27:
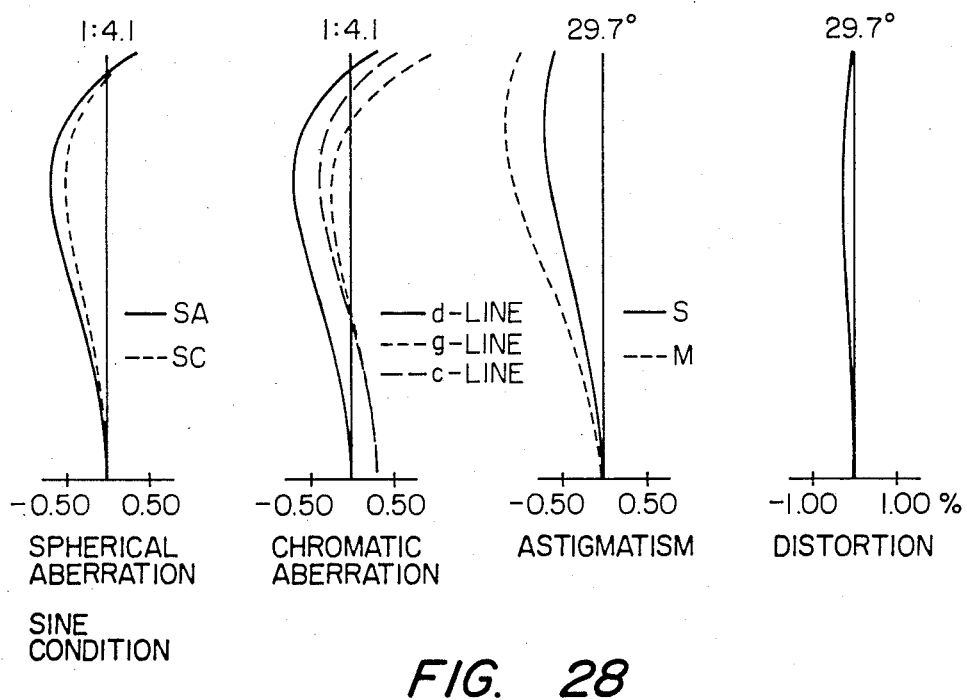
FIG. 27 plots aberration curves for the system of Example 7 at its intermediate focal length.
Figure 28:
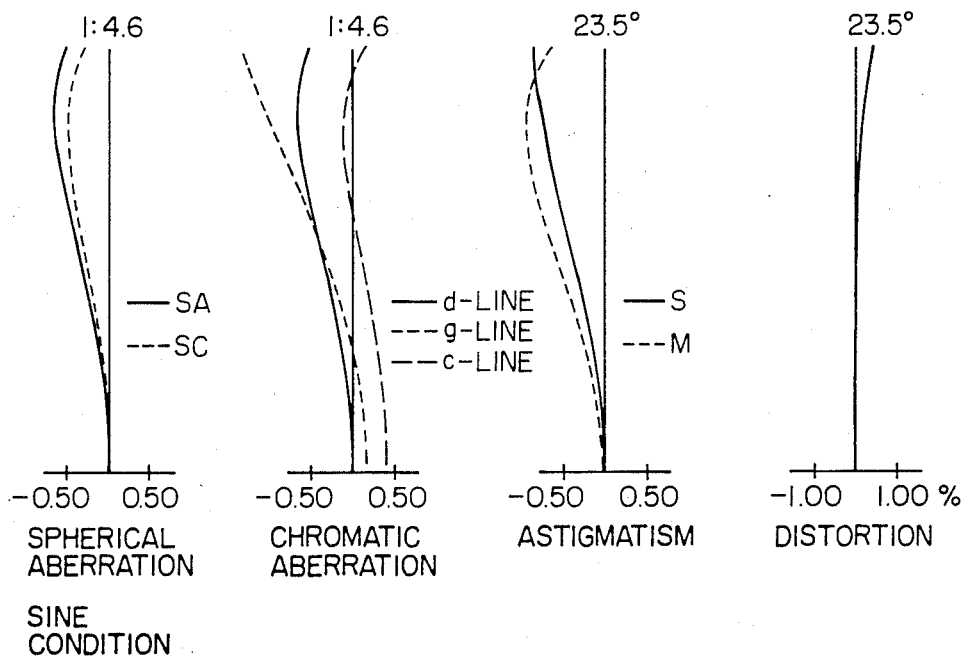
FIG. 28 plots aberration curves for the system of Example 7 at its maximum focal length.

The wide-angle zoom lens system of the present invention comprises, in order from the object side, a first lens group having a negative refractive power, a lens unit having a positive refractive power and a second lens group having a positive refractive power. Zooming with this system is realized by displacing the two lens groups and one lens unit independently in the direction parallel to the optical axis while maintaining the position of the image surface constant. According to the most important characteristic of the present invention, the lens system satisfies the following conditions:

$$D_{IW} > D_{IT}, \text{ and } D_{IIW} > D_{IIT} \quad (1)$$

where $D_I$ represents the aerial space between the first lens group and the lens unit and $D_{II}$ is the aerial space between the lens unit and the second lens group, with the subscripts W and T representing aerial spaces for the short and long focal length sides, respectively.

In a preferred embodiment, the lens system of the invention also satisfies the following conditions:

$$0.8 < |f_I|/f_W < 1.3, \quad (2)$$

$$1.5 < f_{II}/f_W < 2.5, \quad (3)$$

and $$1.5 < f_{III}/f_W < 2.5 \quad (4)$$

where $f_I$, $f_{II}$ and $f_{III}$ represent the focal lengths of the first lens group, the lens unit and the second lens group, respectively, and $f_W$ is the minimum focal length of the overall system.

In a still preferred embodiment, the first lens group consists of, in order from the object side, a positive lens, a negative meniscus lens the convex surface of which is directed toward the object side, a negative lens and a positive lens. The lens unit contains at least one negative lens; and the second lens group comprises at least two negative lenses and at least two positive lenses.

The basic lens arrangement of the system of the present invention permits movement of three "lens groups" by disposing a lens unit of positive refractive power between the front and rear lens groups of the known "two-lens-group" type zoom lens system. In addition, the system of the invention satisfies condition (1) with respect to the aerial space between the first lens group and the lens unit ($D_I$), and the aerial space between the lens unit and the second lens group ($D_{II}$).

Condition (1) concerns the lens arrangement, particularly that of the lens unit. If this condition is met, the lens unit, at the short focal length side, is positioned in front of, but distant from the second lens group in which the diaphragm is to be positioned, and as a result, the lens unit is capable of compensating for barrel distortion. This compensating effect of the lens unit eliminates the need to decrease the negative refractive power of the front group or increase the refractive power of a positive lens in the front group, which techniques have been employed in the conventional two-lens-group type zoom lens system with a view to compensating for the distortion. As a result, the system of the present invention enables efficient compensation of the distortion without increasing other aberrations or compromising the design of a compact system. The compensating effect of the lens unit also allows for the possibility of increasing the refractive power of the first lens group, thereby bringing about additional advantages such as miniaturization of the overall system and the shortening of minimum object distance resulting from the smaller amount of first lens movement involved in focus adjustment.

At the long focal length side, the lens unit is positioned in close proximity to the second lens group. This means that the combined focal length of the lens unit and the second lens group is shorter than that for the short focal length side, and because of the principal point of the overall system lying relatively close to the object, the purpose of reducing the overall size of the system is easily attained.

As described above, significant advantages are obtained by disposing the lens unit in a manner that satisfies condition (1). In order to achieve higher levels of aberration compensation in a balanced manner and for the purpose of miniaturizing the overall system more efficiently, the following condition is desirably satisfied:

$$0.3 < (D_{IIW} - D_{IIT})/(D_{IW} - D_{IT}) < 0.8.$$

In a preferred mode, the zoom lens system of the present invention should also satisfy conditions (2), (3) and (4).

Condition (2) concerns the refractive power of the first lens group. If the lower limit of this condition is not reached, the refractive power of the first lens group is increased, which is advantageous for the purpose of miniaturizing the overall system. But, on the other hand, distortion and other aberrations like spherical aberration and astigmatism are increased to such an extent that the system finds considerable difficulty in maintaining the desired performance even when utilizing the compensating effect of the lens unit. If the upper limit of condition (2) is exceeded, the occurrence of aberrations is reduced and the desired performance of the system can be readily maintained. But, on the other hand, the overall lens length is increased and the lens diameter must be increased in order to ensure a sufficient amount of marginal light, both of which are deleterious to the object of miniaturizing the overall system.

Condition (3) concerns the refractive power of the lens unit. If the lower limit of this condition is not reached, the refractive power of the lens unit is increased to such an extent that considerable difficulty is involved in ensuring the necessary back focus at the short focal length side, and in addition, spherical aberration, comma aberration and astigmatism occurring at the long focal length side tend to be under-compensated. If, on the other hand, the upper limit of condition (3) is exceeded, the refractive power of the lens unit is decreased and it becomes less effective in compensating for barrel distortion at the short focal length side, with the result that the object of the present invention is not attained satisfactorily.

Condition (4) concerns the refractive power of the second lens group. If the lower limit of this condition is not reached, the refractive power of the second lens group is increased to such an extent that considerable difficulty is involved in ensuring the necessary back focus at the short focal length side, and various adverse effects on system performance will occur, such as the tendency to under-compensate for spherical aberration, coma aberration and astigmatism at the long focal length side, and the decreased ability of the second lens group to compensate for barrel distortion occurring at the short focal length side. If, on the other hand, the upper limit of condition (4) is exceeded, the refractive power of the second lens group is decreased and various disadvantages will occur, such as an increase in the overall lens length, and an increase in the movement of the second lens group during zooming. Compensation for this problem requires a complicated automatic aperture control mechanism that, in turn, leads to an increased diameter of the lens barrel.

A more specific lens arrangement according to the invention is as follows: the first lens group consists of, in order from the object side, a positive lens responsible for partial compensation of the barrel distortion at the short focal length side, two negative lenses, the second of which (i.e., the negative lens closer to the object side) is a negative meniscus lens which has a convex surface directed toward the object side so that no aberrations of high order will develop with respect to off-axis light and so that a negative refractive power will be imparted to the first lens group; and adjacent to said two negative lenses, a positive lens provided with a view to cancelling any over-compensated aberrations occurring in said negative lenses.

The lens unit may be composed of any arrangement that will impart a positive refractive power to the unit as a whole, but in order to achieve efficient compensation of chromatic aberration, the unit preferably contains at least one negative lens.

The second lens group preferably contains at least two positive lenses so as to impart a positive refractive power to the group as a whole, and at least two negative lenses for the purpose of compensating for any aberrations, particularly transversal chromatic aberration and coma aberration, that may be under-compensated in the positive lenses.

EXAMPLES

Seven examples of the zoom lens system in accordance with the present invention are described hereinafter. In these examples, f stands for the focal length, $F_{NO}$ F number, $\omega$ the half the view angle, r the radii of curvature of the lens surfaces, d the lens thickness or the aerial space between adjacent lenses, N the refractive indices of lenses, and $\nu$ the Abbe numbers of the lenses. The values of these parameters indicated in the examples are based on $f = 100$.

EXAMPLE 1

| f = 100–172.6 $F_{NO}$ 1:4.6–1:5.7 $\omega = 38.6°–24.3°$ | | | |
|---|---|---|---|
| r | d | N | $\nu$ |
| 1 | 265.468 | 10.57 | 1.62041 | 60.3 |
| 2 | 973.382 | 0.35 | | |
| 3 | 238.972 | 4.78 | 1.78590 | 44.2 |
| 4 | 57.916 | 23.33 | | |
| 5 | −445.499 | 4.42 | 1.77250 | 49.6 |
| 6 | 103.975 | 7.79 | | |
| 7 | 98.234 | 13.03 | 1.80518 | 25.4 |
| 8 | 707.914 | variable | | |
| 9 | 229.322 | 11.52 | 1.67790 | 55.3 |

-continued

| | | | | |
|---|---|---|---|---|
| 10 | −87.599 | 4.80 | 1.75520 | 27.5 |
| 11 | −276.972 | variable | | |
| 12 | 61.624 | 17.26 | 1.72916 | 54.7 |
| 13 | 275.839 | 12.78 | | |
| 14 | −163.992 | 3.54 | 1.62041 | 60.3 |
| 15 | 73.588 | 1.93 | | |
| 16 | 237.758 | 4.09 | 1.83400 | 37.2 |
| 17 | 50.492 | 11.29 | 1.48749 | 70.1 |
| 18 | −67.216 | 0.18 | | |
| 19 | 88.401 | 14.16 | 1.72916 | 54.7 |
| 20 | 123.000 | | | |

| | $d_8$ | $d_{11}$ |
|---|---|---|
| f = 100 | 47.839 | 33.603 |
| 132.7 | 22.901 | 21.053 |
| 172.6 | 6.256 | 12.458 |

$|f_I|/f_W = 1.03$
$f_{II}/f_W = 2.11$
$f_{III}/f_W = 1.80$

EXAMPLE 2 f = 100–172.4   $F_{NO}$ 1:4.6–1:5.7
$\omega$ = 38.2°–24.3°

| | r | d | N | ν |
|---|---|---|---|---|
| 1 | 386.686 | 9.65 | 1.72000 | 50.2 |
| 2 | 3321.006 | 0.36 | | |
| 3 | 296.696 | 4.80 | 1.74320 | 49.3 |
| 4 | 59.314 | 23.44 | | |
| 5 | −861.315 | 4.44 | 1.78590 | 44.2 |
| 6 | 97.125 | 6.93 | | |
| 7 | 92.233 | 15.07 | 1.80518 | 25.4 |
| 8 | 639.289 | variable | | |
| 9 | 249.653 | 17.77 | 1.69680 | 55.5 |
| 10 | −77.316 | 4.82 | 1.80518 | 25.4 |
| 11 | −220.196 | variable | | |
| 12 | 65.586 | 23.10 | 1.75700 | 47.9 |
| 13 | ∞ | 6.58 | | |
| 14 | −123.679 | 3.55 | 1.61117 | 55.9 |
| 15 | 68.257 | 2.61 | | |
| 16 | 235.150 | 4.11 | 1.83400 | 37.2 |
| 17 | 51.835 | 12.07 | 1.51633 | 64.1 |
| 18 | −65.742 | | | |

| | $d_8$ | $d_{11}$ |
|---|---|---|
| f = 100 | 52.949 | 35.086 |
| 133.3 | 23.793 | 20.404 |
| 172.4 | 4.985 | 12.230 |

$|f_I|/f_W = 1.11$
$f_{II}/f_W = 2.01$
$f_{III}/f_W = 2.01$

EXAMPLE 3 f = 100–186.8   $F_{NO}$ 1:4.6–1:5.7
$\omega$ = 41.1°–24.5°

| | r | d | N | ν |
|---|---|---|---|---|
| 1 | 358.929 | 10.85 | 1.72000 | 42.0 |
| 2 | 1906.040 | 0.39 | | |
| 3 | 309.120 | 5.20 | 1.83481 | 42.7 |
| 4 | 62.268 | 25.68 | | |
| 5 | −780.765 | 4.82 | 1.78590 | 44.2 |
| 6 | 104.950 | 6.18 | | |
| 7 | 98.510 | 15.28 | 1.84666 | 23.9 |
| 8 | 695.002 | variable | | |
| 9 | 259.565 | 19.29 | 1.69680 | 55.5 |
| 10 | −81.690 | 5.22 | 1.80518 | 25.4 |
| 11 | −231.213 | variable | | |
| 12 | 70.148 | 21.73 | 1.74320 | 49.3 |
| 13 | −3587.468 | 9.19 | | |
| 14 | −125.550 | 3.85 | 1.60738 | 56.8 |
| 15 | 77.550 | 2.10 | | |
| 16 | 247.626 | 4.45 | 1.83400 | 37.2 |
| 17 | 53.130 | 13.60 | 1.51633 | 64.1 |
| 18 | −69.622 | | | |

| | $d_8$ | $d_{11}$ |
|---|---|---|
| f = 100 | 58.902 | 36.912 |
| 144.4 | 23.000 | 18.781 |
| 186.8 | 5.886 | 9.630 |

$|f_I|/f_W = 1.07$
$f_{II}/f_W = 2.10$
$f_{III}/f_W = 2.08$

EXAMPLE 4 f = 100–186.9   $F_{NO}$ 1:4.6–1:5.7
$\omega$ = 41.1°–24.5°

| | r | d | N | ν |
|---|---|---|---|---|
| 1 | 313.988 | 10.85 | 1.72342 | 38.0 |
| 2 | 1013.132 | 0.39 | | |
| 3 | 263.210 | 5.20 | 1.83400 | 37.2 |
| 4 | 62.651 | 26.32 | | |
| 5 | −517.443 | 4.82 | 1.77250 | 49.6 |
| 6 | 106.728 | 7.50 | | |
| 7 | 103.478 | 14.59 | 1.84666 | 23.9 |
| 8 | 621.810 | variable | | |
| 9 | 273.876 | 14.47 | 1.69100 | 54.8 |
| 10 | −88.399 | 5.22 | 1.76182 | 26.6 |
| 11 | −251.918 | variable | | |
| 12 | 70.302 | 19.31 | 1.72916 | 54.7 |
| 13 | 769.139 | 14.89 | | |
| 14 | −124.708 | 3.85 | 1.62041 | 60.3 |
| 15 | 93.761 | 2.10 | | |
| 16 | 394.762 | 4.45 | 1.83400 | 37.2 |
| 17 | 57.395 | 12.24 | 1.48749 | 70.1 |
| 18 | −67.470 | 0.19 | | |
| 19 | 302.729 | 4.78 | 1.65160 | 58.6 |
| 20 | −15917.500 | | | |

| | $d_8$ | $d_{11}$ |
|---|---|---|
| f = 100 | 54.173 | 34.783 |
| 144.5 | 20.822 | 13.164 |
| 186.9 | 4.857 | 4.576 |

$|f_I|/f_W = 1.04$
$f_{II}/f_W = 2.14$
$f_{III}/f_W = 1.95$

EXAMPLE 5 f = 100–171.6   $F_{NO}$ 1:4.6–1:5.7
$\omega$ = 38.1°–24.4°

| | r | d | N | ν |
|---|---|---|---|---|
| 1 | 406.769 | 9.26 | 1.74320 | 49.3 |
| 2 | 3091.088 | 0.35 | | |
| 3 | 286.126 | 4.78 | 1.74320 | 49.3 |
| 4 | 59.100 | 23.54 | | |
| 5 | −800.463 | 4.43 | 1.78590 | 44.2 |
| 6 | 98.071 | 6.96 | | |
| 7 | 92.711 | 14.78 | 1.80518 | 25.4 |
| 8 | 615.865 | variable | | |
| 9 | 250.119 | 17.70 | 1.69680 | 55.5 |
| 10 | −81.210 | 4.80 | 1.80518 | 25.4 |
| 11 | −211.702 | variable | | |
| 12 | 65.098 | 23.01 | 1.74400 | 44.7 |
| 13 | −383.188 | 3.97 | 1.80518 | 25.4 |
| 14 | 6749.950 | 4.34 | | |
| 15 | −125.702 | 3.54 | 1.60738 | 56.8 |
| 16 | 67.500 | 2.02 | | |
| 17 | 226.509 | 4.09 | 1.83400 | 37.2 |
| 18 | 52.444 | 13.03 | 1.51633 | 64.1 |
| 19 | −65.654 | | | |

| | $d_8$ | $d_{11}$ |
|---|---|---|
| f = 100 | 52.255 | 37.835 |
| 132.7 | 23.649 | 21.344 |
| 171.6 | 5.023 | 12.439 |

-continued $$|f_I|/f_W = 1.09$$
$$f_{II}/f_W = 1.94$$
$$f_{III}/f_W = 2.07$$

EXAMPLE 6 f = 100–171.6   $F_{NO}$ 1:4.6–1:5.7
ω = 38.2°–24.4°

|   | r | d | N | ν |
|---|---|---|---|---|
| 1 | 266.028 | 10.47 | 1.61340 | 43.8 |
| 2 | 858.511 | 0.35 | | |
| 3 | 214.852 | 4.78 | 1.78590 | 44.2 |
| 4 | 58.924 | 24.64 | | |
| 5 | −494.705 | 4.42 | 1.78590 | 44.2 |
| 6 | 102.987 | 6.05 | | |
| 7 | 94.265 | 13.67 | 1.80518 | 25.4 |
| 8 | 730.947 | variable | | |
| 9 | 187.246 | 17.34 | 1.69680 | 55.5 |
| 10 | −79.649 | 4.79 | 1.80518 | 25.4 |
| 11 | −226.562 | variable | | |
| 12 | 64.034 | 23.00 | 1.72047 | 34.7 |
| 13 | −82.539 | 3.96 | 1.80610 | 40.9 |
| 14 | −10637.400 | 4.35 | | |
| 15 | −164.428 | 3.54 | 1.72825 | 28.5 |
| 16 | 55.987 | 2.62 | | |
| 17 | 377.558 | 19.86 | 1.52542 | 64.5 |
| 18 | −65.259 | | | |

|   | $d_8$ | $d_{11}$ |
|---|---|---|
| f = 100 | 51.390 | 24.311 |
| 132.7 | 22.542 | 11.920 |
| 171.6 | 3.538 | 5.307 |

$$|f_I|/f_W = 1.11$$
$$f_{II}/f_W = 1.72$$
$$f_{III}/f_W = 2.22$$

EXAMPLE 7 f = 100–172.3   $F_{NO}$ 1:3.6–1:4.6
ω = 37.1°–23.5°

|   | r | d | N | ν |
|---|---|---|---|---|
| 1 | 391.799 | 10.11 | 1.72000 | 50.2 |
| 2 | 2847.097 | 0.35 | | |
| 3 | 293.242 | 4.80 | 1.74320 | 49.3 |
| 4 | 62.658 | 27.42 | | |
| 5 | −921.594 | 4.45 | 1.78590 | 44.2 |
| 6 | 98.022 | 5.70 | | |
| 7 | 93.310 | 17.34 | 1.80518 | 25.4 |
| 8 | 672.809 | variable | | |
| 9 | 236.970 | 13.80 | 1.69680 | 55.5 |
| 10 | −79.174 | 4.83 | 1.80518 | 25.4 |
| 11 | −228.707 | variable | | |
| 12 | 70.678 | 30.23 | 1.75700 | 47.9 |
| 13 | ∞ | 4.31 | | |
| 14 | −142.441 | 3.54 | 1.62230 | 53.2 |
| 15 | 65.421 | 3.65 | | |
| 16 | 214.797 | 4.10 | 1.83400 | 37.2 |
| 17 | 58.808 | 14.87 | 1.51633 | 64.1 |
| 18 | −71.314 | | | |

|   | $d_8$ | $d_{11}$ |
|---|---|---|
| f = 100 | 62.505 | 30.717 |
| 132.0 | 30.971 | 16.610 |
| 172.3 | 9.146 | 8.722 |

$$|f_I|/f_W = 1.17$$
$$f_{II}/f_W = 1.99$$
$$f_{III}/f_W = 2.21$$

I claim:

1. In a wide-angle zoom lens system comprising, in order from the object side, a first lens group having a negative refractive power, a lens unit having a positive refractive power and a second lens group having a positive refractive power, said system performing zooming by displacing the two lens groups and one lens unit independently in the direction parallel to the optical axis while maintaining the position of the image surface constant, the improvement wherein said system satisfies the following conditions:

$$D_{IW} > D_{IT}, \text{ and } D_{IIW} > D_{IIT}$$

where $D_I$ represents the aerial space between the first lens group and the lens unit, and $D_{II}$ designates the aerial space between the lens unit and the second lens group, with the subscripts W and T representing aerial spaces for the short and long focal length sides, respectively.

2. A wide-angle zoom lens system according to claim 1 which also satisfies the following conditions:

$$0.8 < |f_I|/f_W < 1.3,$$

$$1.5 < f_{II}/f_W < 2.5,$$

and $$1.5 < f_{III}/f_W < 2.5$$

where $f_I$, $f_{II}$ and $f_{III}$ represent the focal lengths of the first lens group, the lens unit and the second lens group, respectively; and $f_W$ is the minimum focal length of the overall system.

3. A wide-angle zoom lens system according to claim 2 wherein the first lens group consists of, in order from the object side, a positive lens, a negative meniscus lens the convex surface of which is directed toward the object side, a negative lens and a positive lens; the lens unit containing at least one negative lens; and the second lens group comprising at least two negative lenses and at least two positive lenses.

4. A wide-angle zoom lens system according to claim 1 further satisfying the following chart:

f = 100–172.6   $F_{NO}$ 1:4.6–1:5.7
ω = 38.6°–24.3°

|   | r | d | N | ν |
|---|---|---|---|---|
| 1 | 265.468 | 10.57 | 1.62041 | 60.3 |
| 2 | 973.382 | 0.35 | | |
| 3 | 238.972 | 4.78 | 1.78590 | 44.2 |
| 4 | 57.916 | 23.33 | | |
| 5 | −445.499 | 4.42 | 1.77250 | 49.6 |
| 6 | 103.975 | 7.79 | | |
| 7 | 98.234 | 13.03 | 1.80518 | 25.4 |
| 8 | 707.914 | variable | | |
| 9 | 229.322 | 11.52 | 1.67790 | 55.3 |
| 10 | −87.599 | 4.80 | 1.75520 | 27.5 |
| 11 | −276.972 | variable | | |
| 12 | 61.624 | 17.26 | 1.72916 | 54.7 |
| 13 | 275.839 | 12.78 | | |
| 14 | −163.992 | 3.54 | 1.62041 | 60.3 |
| 15 | 73.588 | 1.93 | | |
| 16 | 237.758 | 4.09 | 1.83400 | 37.2 |
| 17 | 50.492 | 11.29 | 1.48749 | 70.1 |
| 18 | −67.216 | 0.18 | | |
| 19 | 88.401 | 14.16 | 1.72916 | 54.7 |
| 20 | 123.000 | | | |

|   | $d_8$ | $d_{11}$ |
|---|---|---|
| f = 100 | 47.839 | 33.603 |
| 132.7 | 22.901 | 21.053 |
| 172.6 | 6.256 | 12.458 |

$$|f_I|/f_W = 1.03$$
$$f_{II}/f_W = 2.11$$

-continued $$f_{III}/f_W = 1.80$$

5. A wide-angle zoom lens system according to claim 1 further satisfying the following chart:

$f = 100-172.4$  $F_{NO}$ 1:4.6–1:5.7
$\omega = 38.2°-24.3°$

|    | r         | d        | N       | ν    |
|----|-----------|----------|---------|------|
| 1  | 386.686   | 9.65     | 1.72000 | 50.2 |
| 2  | 3321.006  | 0.36     |         |      |
| 3  | 296.696   | 4.80     | 1.74320 | 49.3 |
| 4  | 59.314    | 23.44    |         |      |
| 5  | −861.315  | 4.44     | 1.78590 | 44.2 |
| 6  | 97.125    | 6.93     |         |      |
| 7  | 92.233    | 15.07    | 1.80518 | 25.4 |
| 8  | 639.289   | variable |         |      |
| 9  | 249.653   | 17.77    | 1.69680 | 55.5 |
| 10 | −77.316   | 4.82     | 1.80518 | 25.4 |
| 11 | −220.196  | variable |         |      |
| 12 | 65.586    | 23.10    | 1.75700 | 47.9 |
| 13 |           | 6.58     |         |      |
| 14 | −123.679  | 3.55     | 1.61117 | 55.9 |
| 15 | 68.257    | 2.61     |         |      |
| 16 | 235.150   | 4.11     | 1.83400 | 37.2 |
| 17 | 51.835    | 12.07    | 1.51633 | 64.1 |
| 18 | −65.742   |          |         |      |

|         | $d_8$  | $d_{11}$ |
|---------|--------|----------|
| f = 100 | 52.949 | 35.086   |
| 133.3   | 23.793 | 20.404   |
| 172.4   | 4.985  | 12.230   |

$|f_I|/f_W = 1.11$
$f_{II}/f_W$ 32 2.01
$f_{III}/f_W = 2.01$

6. A wide-angle zoom lens system according to claim 1 further satisfying the following chart:

$f = 100-186.8$  $F_{NO}$ 1:4.6–1:5.7
$\omega = 41.1°-24.5°$

|    | r         | d        | N       | ν    |
|----|-----------|----------|---------|------|
| 1  | 358.929   | 10.85    | 1.72000 | 42.0 |
| 2  | 1906.040  | 0.39     |         |      |
| 3  | 309.120   | 5.20     | 1.83481 | 42.7 |
| 4  | 62.268    | 25.68    |         |      |
| 5  | −780.765  | 4.82     | 1.78590 | 44.2 |
| 6  | 104.950   | 6.18     |         |      |
| 7  | 98.510    | 15.28    | 1.84666 | 23.9 |
| 8  | 695.002   | variable |         |      |
| 9  | 259.565   | 19.29    | 1.69680 | 55.5 |
| 10 | −81.690   | 5.22     | 1.80518 | 25.4 |
| 11 | −231.213  | variable |         |      |
| 12 | 70.148    | 21.73    | 1.74320 | 49.3 |
| 13 | −3587.468 | 9.19     |         |      |
| 14 | −125.550  | 3.85     | 1.60738 | 56.8 |
| 15 | 77.550    | 2.10     |         |      |
| 16 | 247.626   | 4.45     | 1.83400 | 37.2 |
| 17 | 53.130    | 13.60    | 1.51633 | 64.1 |
| 18 | −69.622   |          |         |      |

|         | $d_8$  | $d_{11}$ |
|---------|--------|----------|
| f = 100 | 58.902 | 36.912   |
| 144.4   | 23.000 | 18.781   |
| 186.8   | 5.886  | 9.630    |

$|f_I|/f_W = 1.07$
$f_{II}/f_W = 2.10$
$f_{III}/f_W = 2.08$

7. A wide-angle zoom lens system according to claim 1 further satisfying the following chart:

$f = 100-186.9$  $F_{NO}$ 1:4.6–1:5.7

-continued $\omega = 41.1°-24.5°$

|    | r          | d        | N       | ν    |
|----|------------|----------|---------|------|
| 1  | 313.988    | 10.85    | 1.72342 | 38.0 |
| 2  | 1013.132   | 0.39     |         |      |
| 3  | 263.210    | 5.20     | 1.83400 | 37.2 |
| 4  | 62.651     | 26.32    |         |      |
| 5  | −517.443   | 4.82     | 1.77250 | 49.6 |
| 6  | 106.728    | 7.50     |         |      |
| 7  | 103.478    | 14.59    | 1.84666 | 23.9 |
| 8  | 621.810    | variable |         |      |
| 9  | 273.876    | 14.47    | 1.69100 | 54.8 |
| 10 | −88.399    | 5.22     | 1.76182 | 26.6 |
| 11 | −251.918   | variable |         |      |
| 12 | 70.302     | 19.31    | 1.72916 | 54.7 |
| 13 | 769.139    | 14.89    |         |      |
| 14 | −124.708   | 3.85     | 1.62041 | 60.3 |
| 15 | 93.761     | 2.10     |         |      |
| 16 | 394.762    | 4.45     | 1.83400 | 37.2 |
| 17 | 57.395     | 12.24    | 1.48749 | 70.1 |
| 18 | −67.470    | 0.19     |         |      |
| 19 | 302.729    | 4.78     | 1.65160 | 58.6 |
| 20 | −15917.500 |          |         |      |

|         | $d_8$  | $d_{11}$ |
|---------|--------|----------|
| f = 100 | 54.173 | 34.783   |
| 144.5   | 20.822 | 13.164   |
| 186.9   | 4.857  | 4.576    |

$|f_I|/f_W = 1.04$
$f_{II}/f_W = 2.14$
$f_{III}/f_W = 1.95$

8. A wide-angle zoom lens system according to claim 1 further satisfying the following chart:

$f = 100-171.6$  $F_{NO}$ 1:4.6–1:5.7
$\omega = 38.1°-24.4°$

|    | r         | d        | N       | ν    |
|----|-----------|----------|---------|------|
| 1  | 406.769   | 9.26     | 1.74320 | 49.3 |
| 2  | 3091.088  | 0.35     |         |      |
| 3  | 286.126   | 4.78     | 1.74320 | 49.3 |
| 4  | 59.100    | 23.54    |         |      |
| 5  | −800.463  | 4.43     | 1.78590 | 44.2 |
| 6  | 98.071    | 6.96     |         |      |
| 7  | 92.711    | 14.78    | 1.80518 | 25.4 |
| 8  | 615.865   | variable |         |      |
| 9  | 250.119   | 17.70    | 1.69680 | 55.5 |
| 10 | −81.210   | 4.80     | 1.80518 | 25.4 |
| 11 | −211.702  | variable |         |      |
| 12 | 65.098    | 23.01    | 1.74400 | 44.7 |
| 13 | −383.188  | 3.97     | 1.80518 | 25.4 |
| 14 | 6749.950  | 4.34     |         |      |
| 15 | −125.702  | 3.54     | 1.60738 | 56.8 |
| 16 | 67.500    | 2.02     |         |      |
| 17 | 226.509   | 4.09     | 1.83400 | 37.2 |
| 18 | 52.444    | 13.03    | 1.51633 | 64.1 |
| 19 | −65.654   |          |         |      |

|         | $d_8$  | $d_{11}$ |
|---------|--------|----------|
| f = 100 | 52.255 | 37.835   |
| 132.7   | 23.649 | 21.344   |
| 171.6   | 5.023  | 12.439   |

$|f_I|/f_W = 1.09$
$f_{II}/f_W = 1.94$
$f_{III}/f_W = 2.07$

9. A wide-angle zoom lens system according to claim 1 further satisfying the following chart:

$f = 100-171.6$  $F_{NO}$ 1:4.6–1:5.7
$\omega = 38.2°-24.4°$

|   | r       | d     | N       | ν    |
|---|---------|-------|---------|------|
| 1 | 266.028 | 10.47 | 1.61340 | 43.8 |
| 2 | 858.511 | 0.35  |         |      |
| 3 | 214.852 | 4.78  | 1.78590 | 44.2 |

-continued

| | | | | |
|---|---|---|---|---|
| 4 | 58.924 | 24.64 | | |
| 5 | −494.705 | 4.42 | 1.78590 | 44.2 |
| 6 | 102.987 | 6.05 | | |
| 7 | 94.265 | 13.67 | 1.80518 | 25.4 |
| 8 | 730.947 | variable | | |
| 9 | 187.246 | 17.34 | 1.69680 | 55.5 |
| 10 | −79.649 | 4.79 | 1.80518 | 25.4 |
| 11 | −226.562 | variable | | |
| 12 | 64.034 | 23.00 | 1.72047 | 34.7 |
| 13 | −82.539 | 3.96 | 1.80610 | 40.9 |
| 14 | −10637.400 | 4.35 | | |
| 15 | −164.428 | 3.54 | 1.72825 | 28.5 |
| 16 | 55.987 | 2.62 | | |
| 17 | 377.558 | 19.86 | 1.52542 | 64.5 |
| 18 | −65.259 | | | |

| | $d_8$ | $d_{11}$ |
|---|---|---|
| f = 100 | 51.390 | 24.311 |
| 132.7 | 22.542 | 11.920 |
| 171.6 | 3.538 | 5.307 |

$|f_I|/f_W = 1.11$
$f_{II}/f_W = 1.72$
$f_{III}/f_W = 2.22$

10. A wide-angle zoom lens system according to claim 1 further satisfying the following chart:

f = 100–172.3    $F_{NO}$ 1:3.6–1:4.6
ω = 37.1°–23.5°

| | r | d | N | ν |
|---|---|---|---|---|
| 1 | 391.799 | 10.11 | 1.72000 | 50.2 |
| 2 | 2847.097 | 0.35 | | |
| 3 | 293.242 | 4.80 | 1.74320 | 49.3 |
| 4 | 62.658 | 27.42 | | |
| 5 | −921.594 | 4.45 | 1.78590 | 44.2 |
| 6 | 98.022 | 5.70 | | |
| 7 | 93.310 | 17.34 | 1.80518 | 25.4 |
| 8 | 672.809 | variable | | |
| 9 | 236.970 | 13.80 | 1.69680 | 55.5 |
| 10 | −79.174 | 4.83 | 1.80518 | 25.4 |
| 11 | −228.707 | variable | | |
| 12 | 70.678 | 30.23 | 1.75700 | 47.9 |
| 13 | ∞ | 4.31 | | |
| 14 | −142.441 | 3.54 | 1.62230 | 53.2 |
| 15 | 65.421 | 3.65 | | |
| 16 | 214.797 | 4.10 | 1.83400 | 37.2 |
| 17 | 58.808 | 14.87 | 1.51633 | 64.1 |
| 18 | −71.314 | | | |

| | $d_8$ | $d_{11}$ |
|---|---|---|
| f = 100 | 62.505 | 30.717 |
| 132.0 | 30.971 | 16.610 |
| 172.3 | 9.146 | 8.722 |

$|f_I|/f_W = 1.17$
$f_{II}/f_W = 1.99$
$f_{III}/f_W = 2.21$

* * * * *